United States Patent [19]

Takahashi et al.

[11] Patent Number: 5,751,419
[45] Date of Patent: May 12, 1998

[54] OPTICAL DELAY APPARATUS

[75] Inventors: Hironori Takahashi; Shinichiro Aoshima, both of Hamamatsu, Japan

[73] Assignee: Hamamatsu Photonics K.K., Hamamatsu, Japan

[21] Appl. No.: 779,605

[22] Filed: Jan. 7, 1997

[30] Foreign Application Priority Data

Jan. 8, 1996 [JP] Japan .................... 8-000869

[51] Int. Cl.⁶ ............................................ G02F 1/00
[52] U.S. Cl. .................... 356/321; 359/226; 359/235
[58] Field of Search ........................ 359/225, 226, 359/232, 234, 235; 356/321

[56] References Cited

U.S. PATENT DOCUMENTS

| | | | |
|---|---|---|---|
| 3,658,422 | 4/1972 | Wilkinson | 356/321 |
| 4,000,946 | 1/1977 | Way et al. | 356/321 |
| 4,168,910 | 9/1979 | Barnard | 359/226 |
| 4,891,580 | 1/1990 | Valdmanis . | |

FOREIGN PATENT DOCUMENTS

| | | |
|---|---|---|
| 921743 | 3/1963 | European Pat. Off. . |
| 3-131772 | 6/1991 | Japan . |
| 4-130233 | 5/1992 | Japan . |

OTHER PUBLICATIONS

IEEE Journal of Quantum Electrics, vol. QE–22, No. 1, Jan. 1986 Subpicosecond Electrooptic Sampling: Principles and Applications, Janis A. Valdmanis et al pp. 69–78.

1994 Asia Pacific Microwave Conference "Strobe Pulse Timing Control in Electro–Optic Sampling" Hironori Takahashi et al, pp. 1167–1170.

Primary Examiner—Georgia Y. Epps
Assistant Examiner—Thomas Robbins
Attorney, Agent, or Firm—Cushman Darby & Cushman IP Group of Pillsbury Madison & Sutro LLP

[57] ABSTRACT

An optical delay apparatus that regularly alternately outputs beams having mutually different delays on one optical axis and that can variably set a delay amount of at least one beam. A motor 112 rotation-drives a rotating plate 111 in which reflective portions and transmissive portions are formed regularly alternately in the circumferential direction. When an incident beam I0 is incident to a reflective portion of the rotating plate 111, it is reflected to generate a beam I1. When the incident beam I0 is incident to a transmissive portion of the rotating plate 111, a beam I2 transmitted is reflected by a reflector 120 to become a beam I3, and the beam I3 is again transmitted by the transmissive portion of the rotating plate 111. This beam I3 has a delay different from that of the beam I1, and the beam I3 and the beam I1 advance regularly alternately in the same direction and on the same optical axis. Further, the reflector 120 is arranged as movable by a moving stage 130, and the delay amount of the beam I3 changes with movement of the reflector.

7 Claims, 13 Drawing Sheets

OPTICAL DELAY APPARATUS

BACKGROUND OF THE INVENTION

1. Field of the Invention

The present invention relates to an optical delay apparatus for alternately generating two beams which have different delays and a delay amount of at least one of which can be changed.

2. Related Background Art

In optical experiments and optical measurements using pulsed light, the optical delay apparatus has been used for changing the timing at which the pulsed light reaches a measured object (for example, U.S. Pat. No. 4,891,580 and IEEE J. of Quantum Electronics. Vol. QE-22, No. 1 (1986) pp. 69–78). FIG. 1 is a structural drawing of an electric-field measuring apparatus using a conventional optical delay apparatus.

In this electric-field measuring apparatus, first, a beam emitted from a picosecond pulsed laser source 1 is split or divided into two beams by a half mirror (plate beam splitter) 2. One beam is guided through an optical modulator 3 for regularly alternating transmission and interruption and then is incident as trigger light to the measured object 4 being a picosecond circuit such as a photoconductive optical switch, for example. With incidence of the trigger light to the measured object 4 an electric pulse occurs because of photoelectric conversion, and this electric pulse is applied to an electro-optic material 5 which changes its refractive index depending upon a voltage applied thereto.

The other beam split by the half mirror 2 passes via an optical delay apparatus 6, a polarizer 7, and a phase compensator 8 to be condensed by a lens 9, and the condensed beam is incident as sampling light to the electro-optic material 5 to be transmitted thereby. At this time the sampling light changes its polarization state with change in the refractive index depending upon the voltage applied to the electro-optic material 5. The change in the polarization state of the sampling light is converted into change in the intensity of the sampling light as it passes through an analyzer 10. Accordingly, a value obtained when the intensity of this sampling light is measured by a photodetector 11 is dependent on a value of the voltage applied to the electro-optic material 5.

An output value of this photodetector 11 is synchronously detected at modulation timing of the optical modulator 3 by a lock-in amplifier 12, and a difference is detected between output values of the photodetector 11 when the trigger light is incident to the measured object 4 and when it is not incident thereto. The output from the lock-in amplifier 12 is applied to a summing/averaging device 13 to decrease noise, and thereafter the resultant signal is supplied to a waveform display 14. As the timing of incidence of the sampling light to the electro-optic material 5 is changed relative to the timing of incidence of the trigger light to the measured object 4 by the optical delay apparatus 6, signals according to differences between the timings are also put as sweep signals into the waveform display 14. In this way the apparatus can measure a voltage waveform in the picosecond circuit after incidence of the trigger light.

Incidentally, another conventional example similar to the structure of the electric-field measuring apparatus, though being not the electric-field measuring apparatus, performs a method for using two reflective optical choppers to alternately generate two different beams, based on a beam output from a light source, and guiding the two beams through respective light paths different from each other then to again output them on a same optical axis, as disclosed in the spectrophotometer shown in FIG. 2 (Japanese Laid-open Patent Application No. 4-130233).

In this spectrophotometer, a beam output from a light source 30 travels via a monochromator 31 and in an optical path 32 to reach a rotating plate 22b of a first reflective optical chopper 22. This rotating plate 22b is constructed to have transmissive portions 22ba and reflective portions 22bb formed alternately in the circumferential direction, thereby regularly alternating transmission and reflection of the beam incident with rotation thereof. The beam passing through the transmissive portion 22ba of the rotating plate 22b then passes through a reference cell 33 and a wedge filter 34, then is reflected by a reflector 35a, and then reaches a rotating plate 23b of a second reflective optical chopper 23. On the other hand, the beam reflected by the reflective portion 22bb of the rotating plate 22b travels in an optical path 32b, is reflected by a reflector 35b, passes through a sample cell 36, and then reaches the rotating plate 23b of the second reflective optical chopper 23.

The first reflective optical chopper 22 and second reflective optical chopper 23 are driven by a driving device 37 to rotate at same rotating speed and with a phase difference of 180° between them. In more detail, when the rotating plate 22b of the first reflective optical chopper 22 reflects the beam, the rotating plate 23b of the second reflective optical chopper 23 transmits the beam; when the rotating plate 22b of the first reflective optical chopper 22 transmits the beam, the rotating plate 23b of the second reflective optical chopper 23 reflects the beam. As described, the beam advances as regularly alternating its path between the optical path 32a and the optical path 32b with rotation of the two reflective optical choppers 22 and 23, whereby the beam passing through the reference cell 33 and the beam passing through the sample cell 36 alternately reach a photodetector 38. Then output values of the photodetector 38 are synchronously detected by a lock-in amplifier 39 at the timing for the driving device 37 to rotation-drive the reflective optical choppers 22 and 23, thereby obtaining an output according to a ratio of intensities of the two beams.

SUMMARY OF THE INVENTION

An object of the present invention is thus to provide an optical delay apparatus that can regularly alternately output beams having mutually different delays on one optical axis and that can variably set a delay amount of at least one beam.

An optical delay apparatus according to the present invention comprises beam splitting/coupling means for, with incidence of an incident beam, alternately generating a first beam traveling in an opposite direction to the incident beam and a second beam traveling in the same direction as the incident beam and for, with incidence of a third beam traveling in the opposite direction to the second beam, alternately outputting the first beam when the first beam is generated and the third beam when not so, on a same optical axis and in a same direction, reflecting means for outputting the third beam, based on the second beam, and moving means for moving at least the reflecting means in a direction of an optical axis of the second beam.

In this optical delay apparatus, when the incident beam is incident to the beam splitting/coupling means, the means alternately generates the first beam traveling in the opposite direction to the incident beam and the second beam traveling in the same direction as the incident beam. When the second beam is incident to the reflecting means, the reflecting means generates the third beam, based on the second beam, and the third beam is incident to the beam splitting/coupling means. Then the beam splitting/coupling means alternately outputs the first beam and the third beam having respective delays different from each other. When the reflecting means is moved by the moving means, the delay of the third beam varies.

An optical delay apparatus according to another aspect of the present invention further comprises a semi-transparent mirror for reflecting a part of each of the first and third beams output from the beam splitting/coupling means, in a direction different from the incident direction, wherein the beam splitting/coupling means comprises a rotating plate which has reflective portions and transmissive portions formed regularly alternately on a circumference about a center point on a plane normal to the optical axis of the incident beam, which, when the incident beam is incident to the reflective portion, reflects the incident beam to generate the first beam, and which, when the incident beam is incident to the transmissive portion, transmits the incident beam to generate the second beam and to transmit the third beam, and a rotation drive section for rotating the rotating plate at constant speed about the center point on the plane, and wherein the reflecting means is a reflector having a reflective surface normal to the optical axis of the second beam. In this case, the first and third beams output from the beam splitting/coupling means are alternately generated with rotation of the rotating plate to travel in the opposite direction to the incident beam and on the same optical axis and then to be partly reflected by the semi-transparent mirror to travel on an optical axis different from that of the incident beam.

In an optical delay apparatus according to still another aspect of the present invention, the reflecting means comprises a plurality of reflective surfaces, and with incidence of the second beam thereto, it generates the third beam having an optical axis different from the optical axis of the second beam. In this case, the first and third beams output from the beam splitting/coupling means travel in the opposite direction to the incident beam and on an optical axis different from that of the incident beam.

In an optical delay apparatus according to still another aspect of the present invention, the beam splitting/coupling means comprises a first rotating plate in which first reflective portions and first transmissive portions are formed regularly alternately on a circumference about a first center point on a first plane not normal to the optical axis of the incident beam, which, when the incident beam is incident to the first reflective portion, reflects the incident beam to generate a fourth beam, and which, when the incident beam is incident to the first transmissive portion, transmits the incident beam to generate the second beam; a second rotating plate in which second reflective portions and second transmissive portions are formed regularly alternately on a circumference about a second center point on a second plane perpendicular to the first plane, which, when the fourth beam is incident to the second reflective portion, reflects the fourth beam to generate the first beam, and which, when the third beam is incident to the second transmissive portion, transmits the third beam; a first rotation drive section for rotating the first rotating plate at constant speed about the first center point on the first plane; a second rotation drive section for rotating the second rotating plate at constant speed about the second center point on the second plane; and a rotation control section for controlling the first and second rotation drive sections so that when the first rotating plate generates the fourth beam, the second rotating plate reflects the fourth beam to generate the first beam and so that when not so, the second rotating plate transmits the third beam. In this case, alternately generated with synchronous rotation of the first and second rotating plates are the first beam generated in such a manner that the incident beam is reflected by the first rotating plate to become the fourth beam and the fourth beam is reflected by the second rotating plate, and the third beam generated in such a manner that the incident beam is transmitted by the first rotating plate to become the second beam and it is then generated by the reflecting means to be transmitted by the second rotating plate.

In an optical delay apparatus according to still another aspect of the present invention, the beam splitting/coupling means comprises a rotating plate in which reflective portions and transmissive portions are formed regularly alternately on a circumference about a center point on a plane not normal to the optical axis of the incident beam, which, when the incident beam is incident to the reflective portion, reflects the incident beam to generate a fourth beam and also reflects a fifth beam incident thereto as traveling in the opposite direction to the fourth beam, to generate the first beam, and which, when the incident beam is incident to the transmissive portion, transmits the incident beam to generate the second beam, a rotation drive section for rotating the rotating plate at constant speed about the center point on the plane, and a reflective section having a plurality of reflective surfaces to generate the fifth beam, based on the fourth beam. In this case, alternately generated with rotation of the rotating plate are the first beam generated in such a manner that the incident beam is reflected by the rotating plate to become the fourth beam and then the fifth beam generated by the reflective section is again reflected by the rotating plate, and the third beam generated in such a manner that the incident beam is transmitted by the rotating plate to become the second beam and it is then generated by the reflecting means to be again transmitted by the rotating plate.

In an optical delay apparatus according to still another aspect of the present invention, the moving means moves the beam splitting/coupling means and the reflecting means in an integral manner. In this case, the first and third beams maintain constant a delay difference between them, but change their respective delay amounts.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
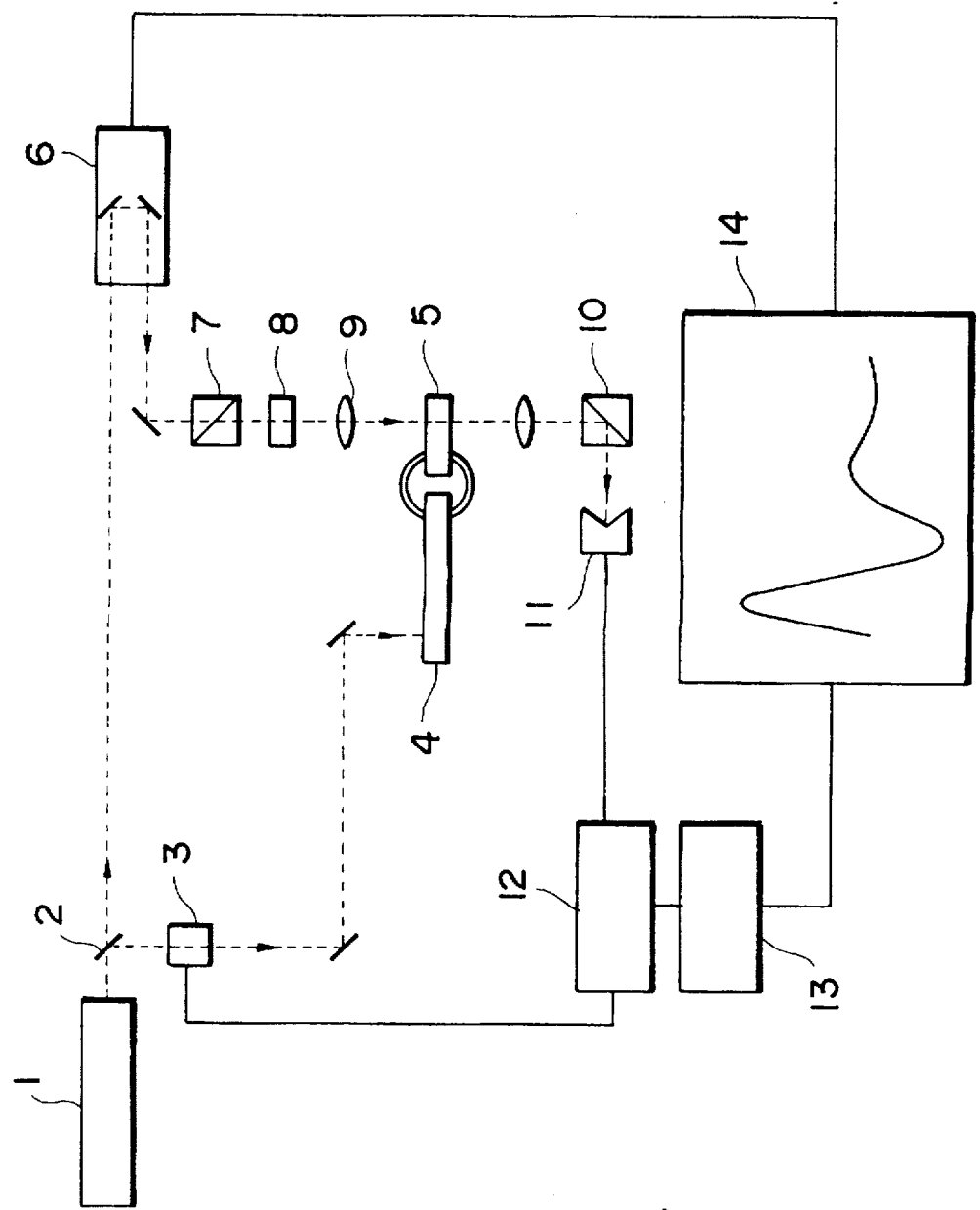
FIG. 1 is a structural drawing of the electric-field measuring apparatus using the conventional optical delay apparatus.

The optical delay apparatus used in the electric-field measuring apparatus shown in FIG. 1 is arranged to adjust the timing of incidence of the sampling light to the electro-optic material 5 with respect to the reference at the time of incidence of the trigger light to the measured object 4, and the sampling light is steadily incident to the electro-optic material 5. Therefore, in order to synchronously detect the intensity of the sampling light in the lock-in amplifier 12, the trigger light must be optically modulated by the optical modulator 3. However, when the trigger light is incident to the measured object 4 as being subjected to modulation of transmission and interruption thereof, the modulation will disorder the operation of the measured object 4, and the electric pulses generated by photoelectric conversion sometimes become unstable, which does not allow accurate measurement.

Figure 2:
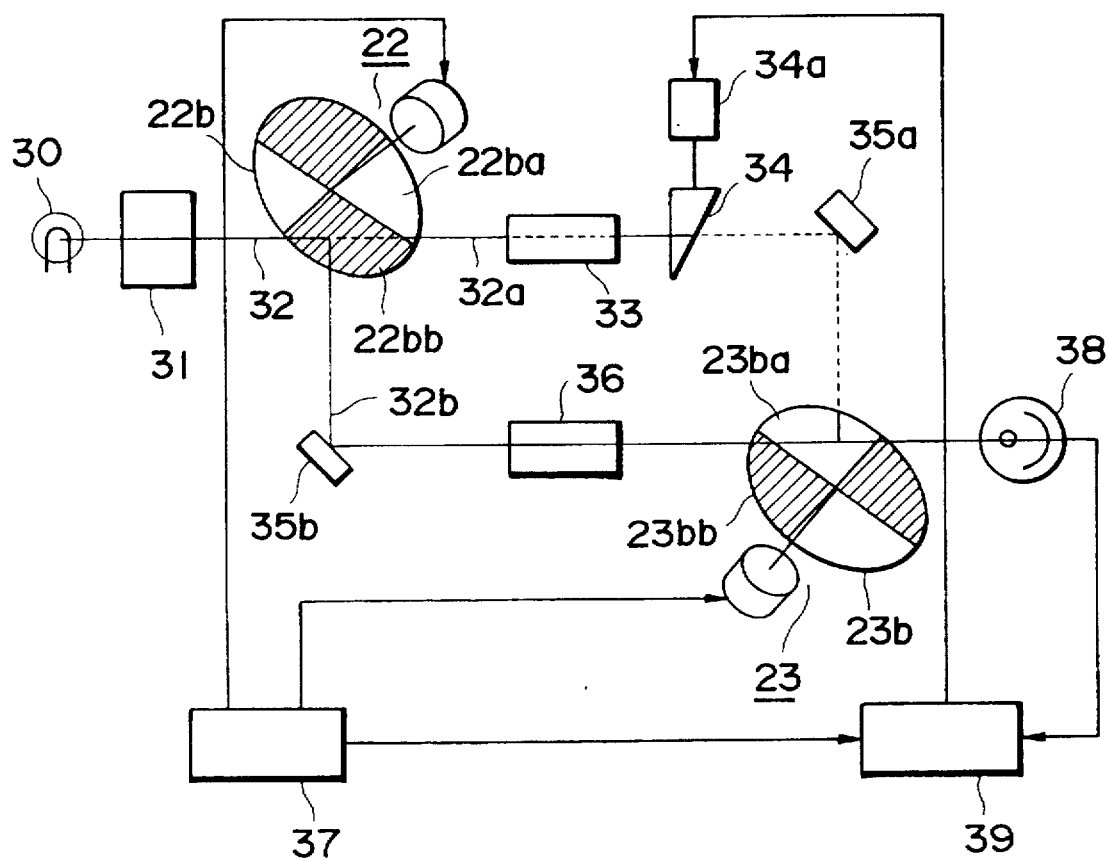
FIG. 2 is a structural drawing of the conventional spectrophotometer.

On the other hand, the spectrophotometer shown in FIG. 2 uses the reflective choppers and lock-in amplifier, and is similar in the structure to the electric-field measuring apparatus. However, the spectrophotometer, though regularly switching the optical paths, does not have the optical delay apparatus for changing the optical path difference with time, and therefore, nothing is described or suggested about it.

The embodiments of the present invention will be described in detail with reference to the accompanying drawings. In the description of the drawings same elements will be denoted by same symbols and redundant description will be omitted.

(First Embodiment)

Figure 3:
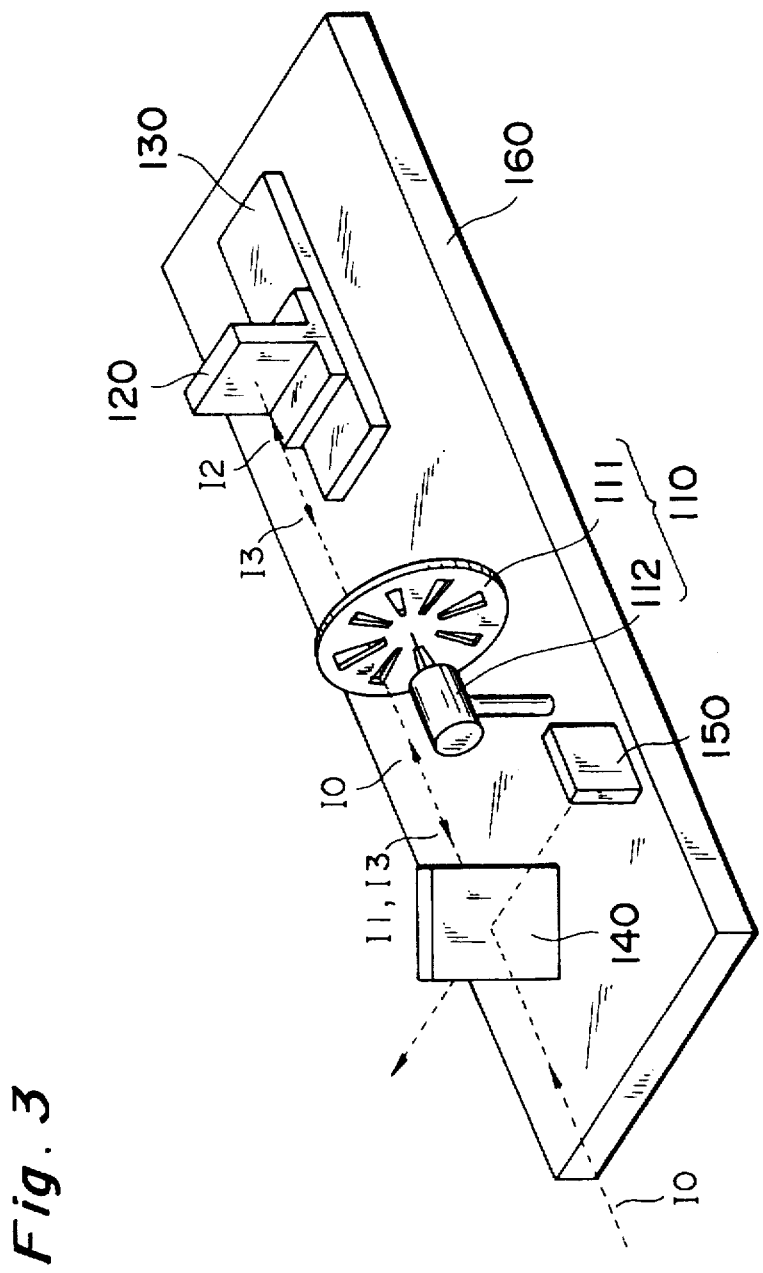
FIG. 3 is a perspective view of an optical delay apparatus according to the first embodiment.

First explained is the first embodiment. FIG. 3 is a perspective view of the optical delay apparatus according to the present embodiment.

The optical delay apparatus according to the present embodiment comprises a reflective optical chopper 110 for subjecting the incident beam I0 to alternate reflection and transmission to alternately generate a reflected beam I1 and a transmitted beam I2, a reflector 120 for normally reflecting the beam I2 transmitted by the reflective optical chopper 110 to generate beam I3 again traveling toward the reflective optical chopper 110, a moving stage 130 on which the reflector 120 is fixed and which can reciprocally move in the directions along the optical axis of the beam I2, a half mirror 140 for reflecting a part of each of the beam I1 reflected by the reflective optical chopper 110 and the beam I3 reflected and generated by the reflector 120, in a direction different from the direction of the optical axis of the incident beam I0, a shield plate 150 for shielding a beam resulting from partial reflection of the incident beam I0 from the half mirror 140, and a fixed base 160 for fixing the reflective optical chopper 110, half mirror 140, and shield plate 150 and permitting the moving stage 130 to move thereon.

Figure 4:
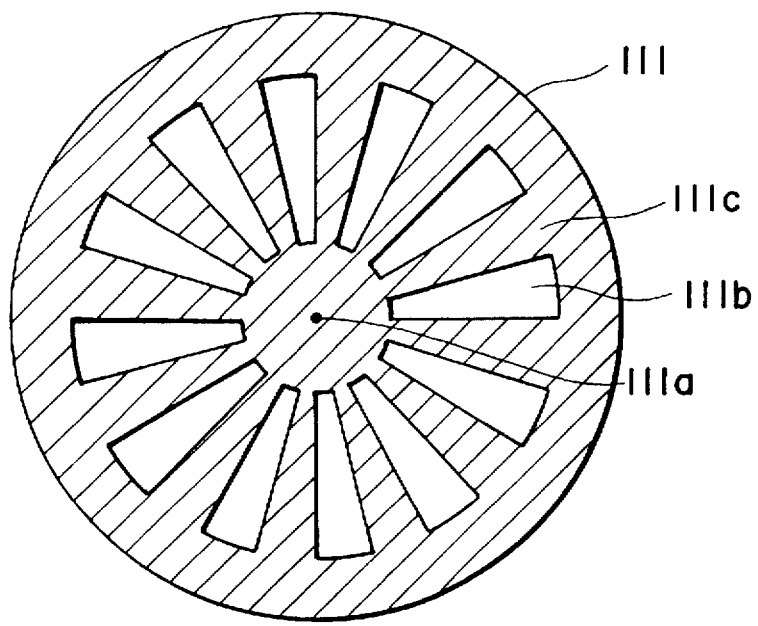
FIG. 4 is an explanatory drawing of a rotating plate of reflective optical chopper.

The reflective optical chopper (beam splitting/coupling means) 110 for alternately generating the reflected beam I1 and transmitted beam I2 from the incident beam I0 is comprised of a rotating plate 111 for rotating on a center point 111a and a motor 112 for rotating the rotating plate at constant speed. The rotating plate 111 is constructed to include transmissive portions 111b for transmitting a beam and reflective portions 111c for reflecting a beam, arranged regularly alternately in the circumferential direction about the center point 111a, as shown in FIG. 4. Then this rotating plate 111 is positioned normal to the direction of the optical axis of the incident beam I0 and is located at a position where it can repeat alternate transmission and reflection of the incident beam I0 with rotation. Therefore, with rotation of the rotating plate 111 at constant speed, when the incident beam passes through the transmissive portion 111b, the transmitted beam I2 is generated and the beam I2 advances toward the reflector 120; when the incident beam is reflected by the reflective portion 111c, the reflected beam I1 is generated and the beam I1 advances toward the half mirror 140. Namely, these reflected beam I1 and transmitted beam I2 are generated regularly alternately. The transmissive portions 111b may be perforations or may be made of a member such as transparent glass which transmits the light.

The reflective surface of the reflector 120 for generating the beam I3 with incidence of the transmitted beam I2 is normal to the direction of the optical axis of the transmitted beam I2, and thus, the beam I3 travels in the opposite direction to and on the same optical axis as the transmitted beam I2. The moving stage 130 for moving this reflector 120 is one for moving the reflector in the directions along the optical axis of the transmitted beam I2, which is constructed in the rack-and-pinion structure, for example.

Figure 5:
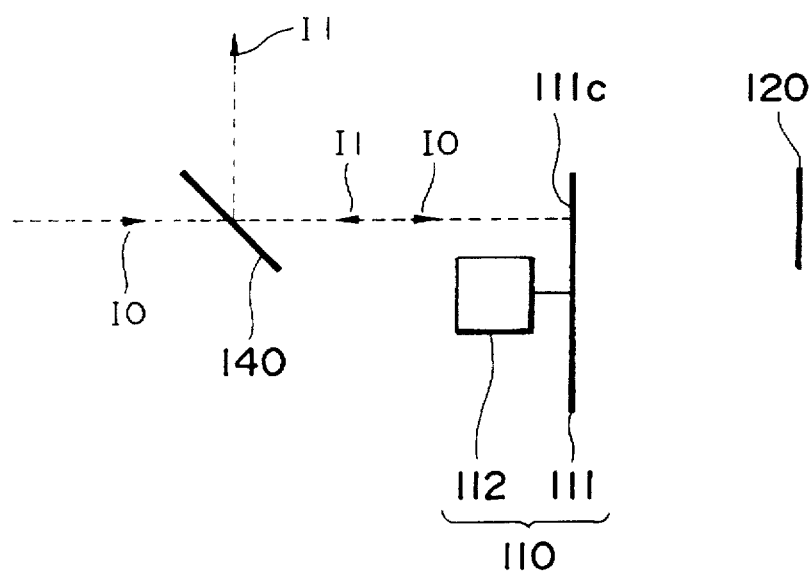
FIGS. 5 and 6 are explanatory drawings of the operation of the optical delay apparatus according to the first embodiment.
Figure 6:
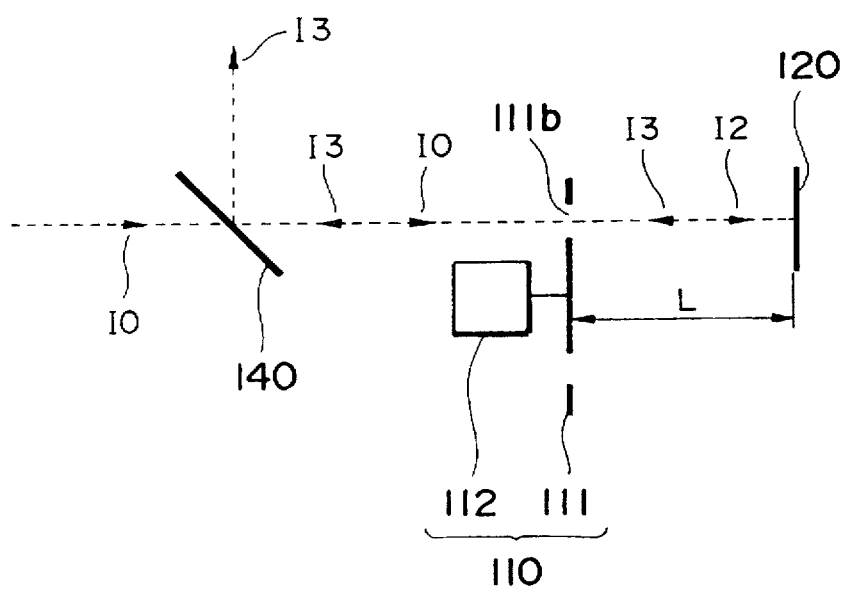

The optical delay apparatus according to the present embodiment acts as follows. FIGS. 5 and 6 are explanatory drawings of the operation of the optical delay apparatus according to the present embodiment.

When the incident beam I0 partly transmitted by the half mirror 140 is incident to the reflective portion 111c of the rotating plate 111 (FIG. 5), the incident beam I0 is reflected by the reflective portion 111c to generate the reflected beam I1. The reflected beam I1 travels in the opposite direction to and on the same optical axis as the incident beam I0, to reach the half mirror 140. The beam I1 is partly reflected by the half mirror 140.

On the other hand, when the incident beam I0 partly transmitted by the half mirror 140 is incident to the transmissive portion 111b of the rotating plate 111 (FIG. 6), the incident beam I0 is transmitted by the transmissive portion 111b to generate the transmitted beam I2. The transmitted beam I2 reaches the reflector 120 to be reflected to generate the beam I3. The beam I3 travels in the opposite direction to and on the same optical axis as the transmitted beam I2, the beam is again transmitted by the transmissive portion 111b of the rotating plate 111, and then it reaches the half mirror 140 to be partly reflected thereby.

As the rotating plate 111 is rotated at constant speed by the motor 112, the beam I1 and beam I3 are generated regularly alternately and are output on the same optical axis. Letting L be the distance between the reflective portion 111c of the rotating plate 111 and the reflective surface of the reflector 120, the beam I3 has an optical pathlength difference 2L longer than that of the beam I1 having the fixed optical path, and the pathlength difference can be changed by moving the position of the reflector 120 by the moving stage 130. Further, if the rotating plate 111 is rotated at constant speed by the motor 112 so that the switching frequency of the reflective portions 111c and transmissive portions 111b is f (Hz), the beam I1 and beam I3 having the pathlength difference 2L between them will be generated alternately at repeating frequency f' (Hz).

Figure 7:
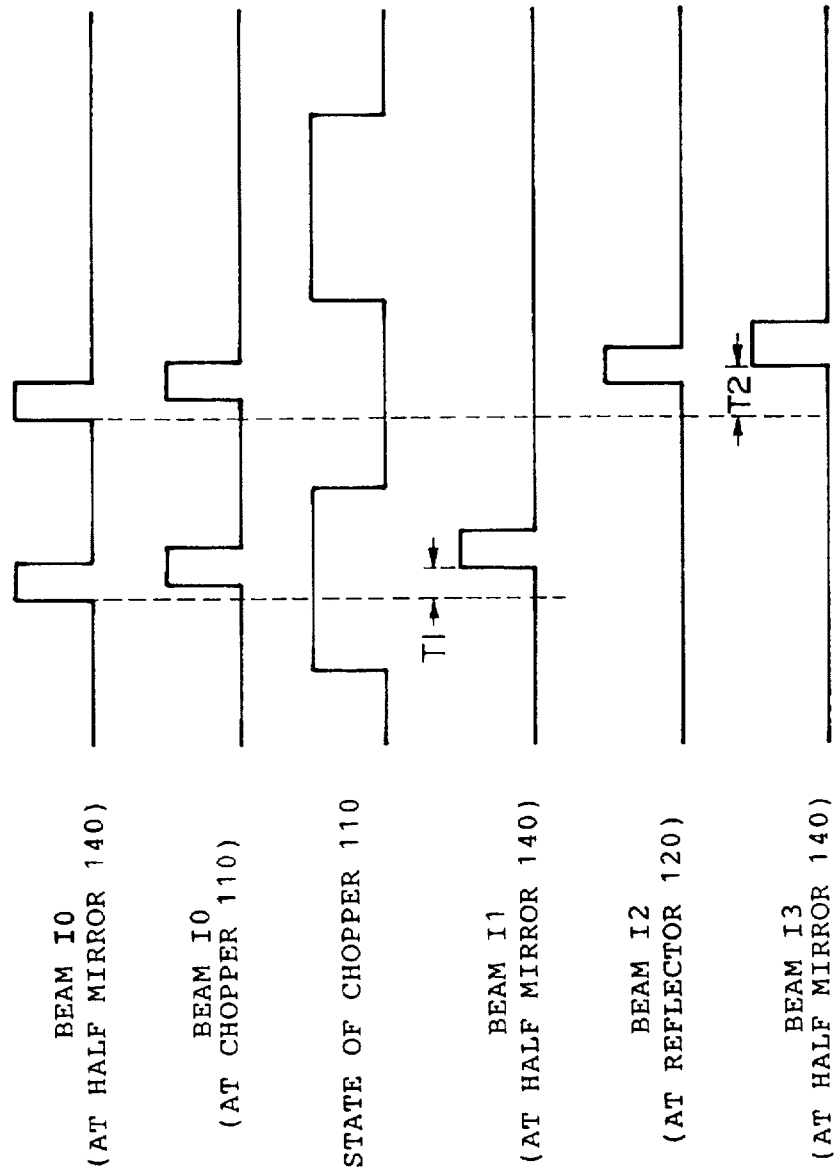
FIG. 7 is a timing chart of the optical delay apparatus according to the first embodiment.

FIG. 7 shows an operation timing of the optical delay apparatus according to the present embodiment.

In FIG. 7, the case that a relation between the switching frequency f and the repeating frequency is f'=2f is shown. However, it is not necessary that the chopping operation is synchronized with the inputting pulse beam. The optical delay apparatus according to the present invention performs preferably when the repeating frequency f' is higher than the switching frequency f.

(Second Embodiment)

Figure 8:
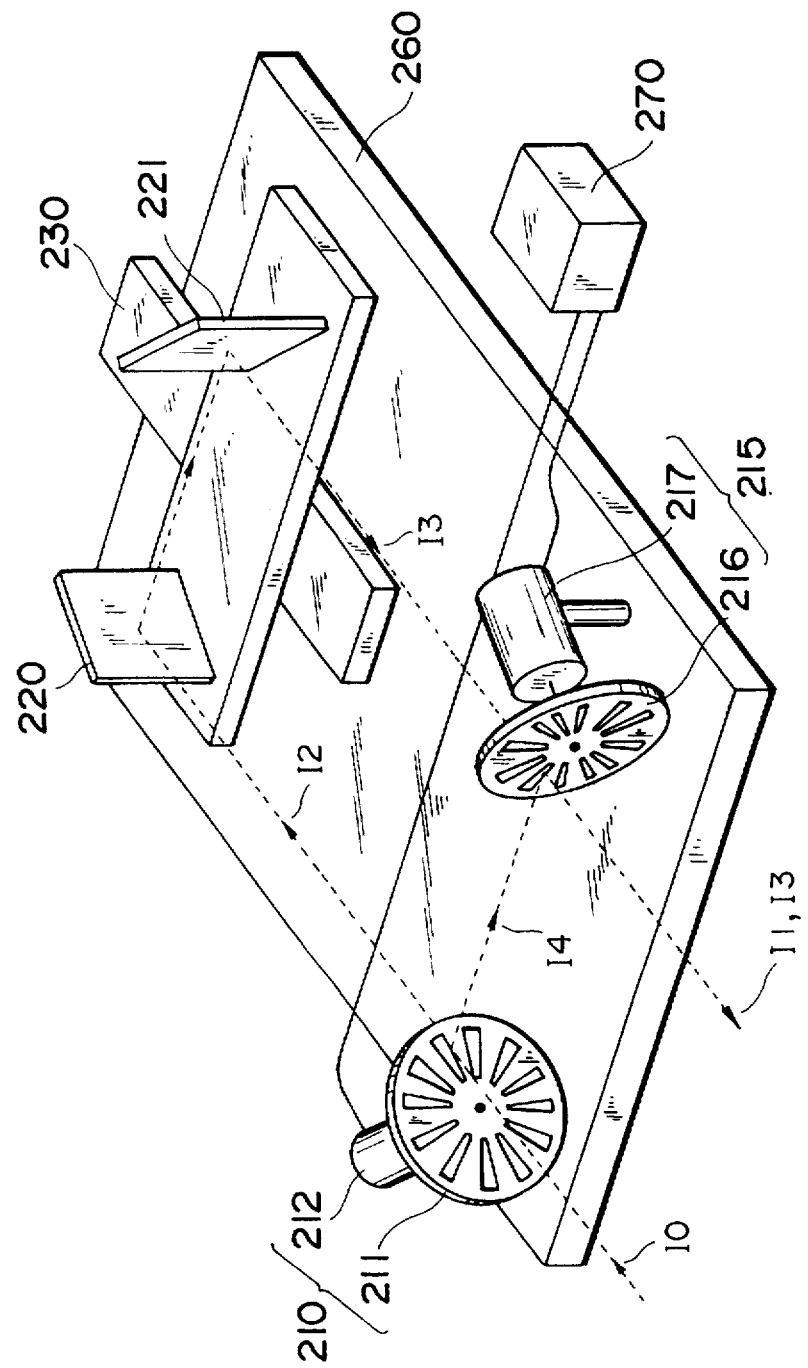
FIG. 8 is a perspective view of an optical delay apparatus according to the second embodiment.

Next explained is the second embodiment. FIG. 8 is a perspective view of the optical delay apparatus according to the present embodiment.

The optical delay apparatus according to the present embodiment comprises a reflective optical chopper 210 for subjecting the incident beam I0 to alternate reflection and transmission to alternately generate a reflected beam I4 and a transmitted beam I2, reflectors 220 and 221 for reflecting the beam I2 transmitted by the reflective optical chopper 210 to generate a beam I3 traveling in parallel with the optical axis of the beam I2 and in the opposite direction thereto, a reflective optical chopper 215 for reflecting the beam I4 reflected by the reflective optical chopper 210 with incidence thereof and for transmitting the beam I3 with incidence of the beam I3 reflected by the reflector 221, a moving stage 230 on which the reflectors 220 and 221 are fixed and which can move in the directions along the optical axis of the beam I2, a fixed base 260 for fixing the reflective optical choppers 210, 215 thereon, which permits the moving stage 230 to move thereon, and a chopper controller 270 for controlling rotation synchronized with reflection/transmission of beam at the two reflective optical choppers 210 and 215.

The reflective optical choppers 210 and 215 each for generating the transmitted beam and reflected beam are constructed in the same structure as the reflective optical chopper 110 as described in the first embodiment. However, arrangement angles of the choppers 210 and 215 are different from that in the first embodiment with respect to the optical axis of the incident beam. Namely, the rotating plate 211 of the reflective optical chopper 210 is arranged so that the normal line thereto makes the angle α° with respect to the optical axis of the incident beam I0, while the rotating plate 216 of the reflective optical chopper 215 is arranged so that the normal line thereto makes the angle (90-α)° with respect to the optical axis of the beam I4. Further, the rotating plate 216 is located at a position where it can reflect the beam I4 reflected by the rotating plate 211. Accordingly, when the beam I4 reflected and generated when the incident beam I0 is incident to the reflective portion of the rotating plate 211 reaches the reflective portion of the rotating plate 216, the beam I4 is reflected by the reflective portion of the rotating plate 216 to generate the beam I1. The optical axis of this beam I1 is parallel to that of the incident beam I0 and the beam I1 travels in the opposite direction to the direction of incidence of the incident beam I0.

The reflector 220, which reflects the beam I2 transmitted by the transmissive portion of the rotating plate 211 of the reflective optical chopper 210, is located so that the normal line to the reflective surface thereof makes the angle β° relative to the optical axis of the beam I2, while the reflector 221 is located so that the normal line to the reflective surface thereof makes the angle (90-β)° relative to the optical axis of the beam arriving after reflected by the reflector 220. Therefore, the optical axis of the beam I3 generated as reflected by the reflector 221 is parallel to the optical axis of the beam I2 incident to the reflector 220 and the beam I3 travels in the opposite direction to the beam I2.

Further, the reflectors 220, 221 are arranged so that after the reflective optical chopper 215 the optical axis of the beam I3 generated as reflected by the reflector 221 comes to be aligned with the same optical axis as the beam I1 generated as reflected by the rotating plate 216.

The chopper controller 270 for controlling the rotation of the reflective optical choppers 210 and 215 controls rotation of motors 212 and 217 for respectively rotating the rotating plates 211 and 216 so that when the rotating plate 211 reflects the incident beam I0, the rotating plate 216 also reflects the beam I4 and so that when the rotating plate 211 transmits the incident beam I0, the rotating plate 216 also transmits the beam I3.

Figure 9:
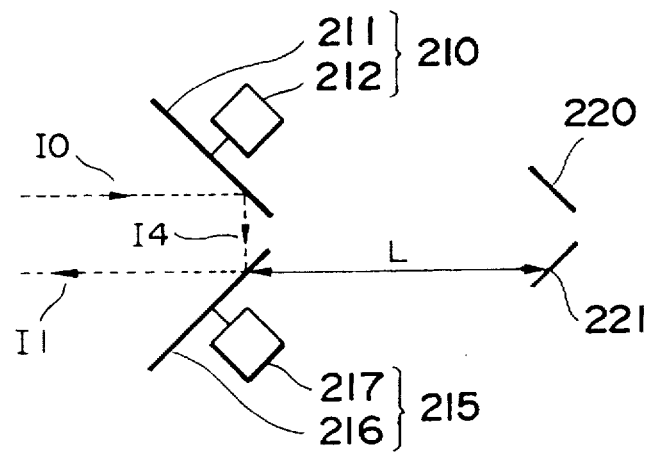
FIGS. 9 and 10 are explanatory drawings of the operation of the optical delay apparatus according to the second embodiment.
Figure 10:
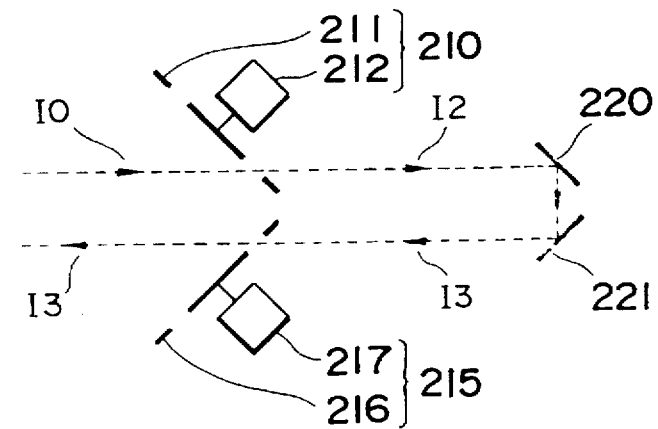

The optical delay apparatus according to the present embodiment acts as follows. FIGS. 9 and 10 are explanatory drawings of the operation of the optical delay apparatus according to the present embodiment.

When the incident beam I0 is incident to the reflective portion of the rotating plate 211 (FIG. 9), the incident beam I0 is reflected by the reflective portion of the rotating plate 211 to generate the beam I4. The beam I4 is incident to the reflective portion of the rotating plate 216 to be reflected thereby, thus generating the beam I1. This beam I1 travels in the opposite direction to the incident beam I0 and on the optical axis parallel to that of the incident beam I0.

On the other hand, when the incident beam I0 is incident to the transmissive portion of the rotating plate 211 (FIG. 10), the incident beam I0 is transmitted by the transmissive portion of the rotating plate 211 to generate the beam I2. The beam I2 is reflected by each of the reflectors 220 and 221, thus generating the beam I3. The beam I3 is transmitted by the transmissive portion of the rotating plate 216 to travel on the same optical axis as the beam I1.

As the rotating plates 211 and 216 are rotated by the motors 212 and 217, respectively, under rotation control by the chopper controller 270, the beam I1 having a fixed optical pathlength and the beam I3 having an optical pathlength different from that of the beam I1 are generated regularly alternately to be output on the same optical axis. By moving the reflectors 220 and 221 by the moving stage 230, the optical pathlength difference between the beam I1 and the beam I3 can be changed.

An operation timing of the optical delay apparatus according to the present embodiment is similar the operation timing in FIG. 7.

Since the optical delay apparatus according to the present embodiment does not need to use the half mirror, which was necessitated in the optical delay apparatus according to the first embodiment, the outgoing beam (beam I1 or beam I3) can be obtained without a loss in the light quantity of incident beam I0.

(Third Embodiment)

Figure 11:
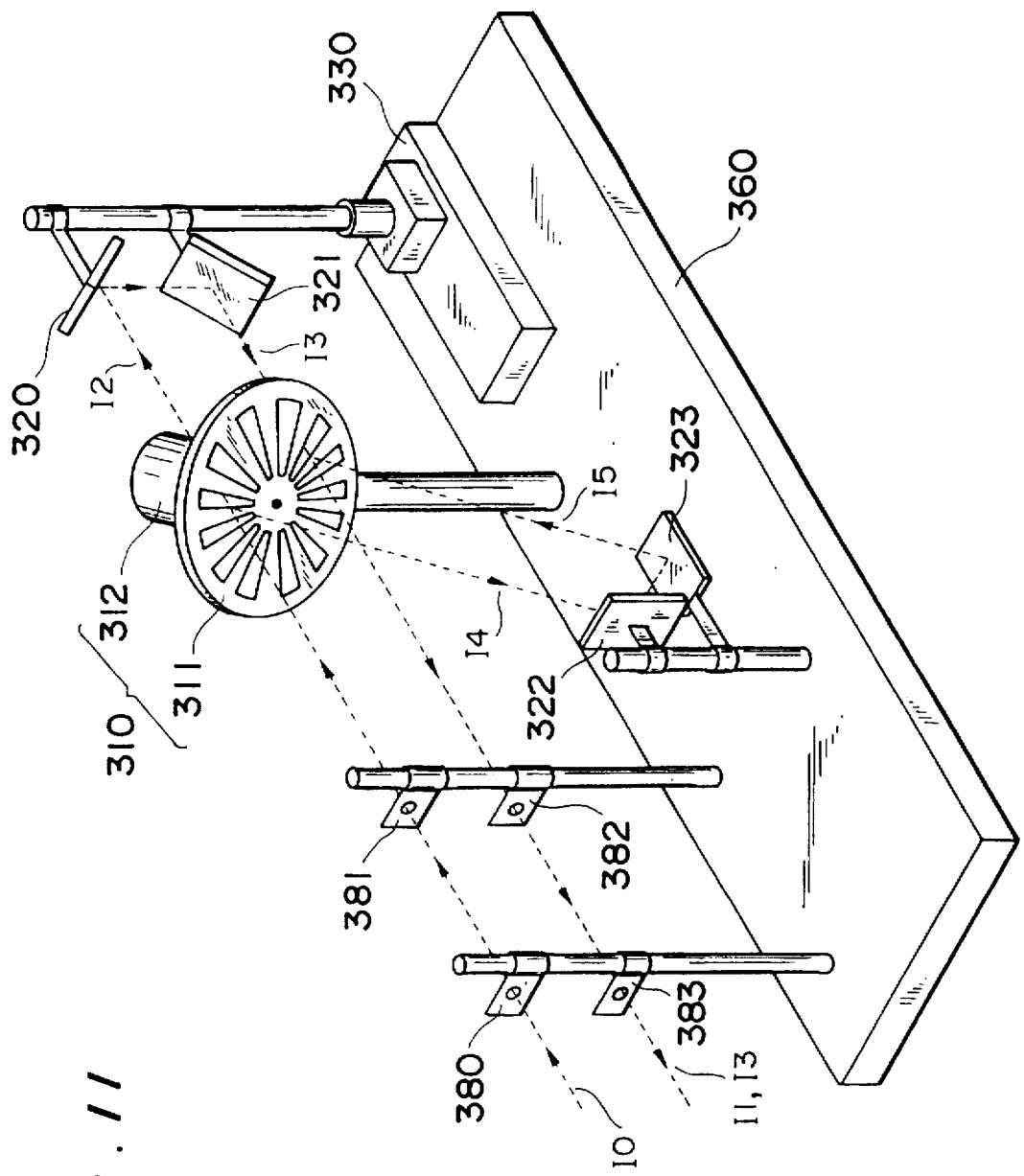
FIG. 11 is a perspective view of an optical delay apparatus according to the third embodiment.

Next explained is the third embodiment. FIG. 11 is a perspective view of the optical delay apparatus according to the present embodiment.

The optical delay apparatus according to the present embodiment comprises a reflective optical chopper 310 for subjecting the incident beam I0 to alternate reflection and transmission to alternately generate a reflected beam I4 and a transmitted beam I2, reflectors 320 and 321 for reflecting the beam I2 transmitted by the reflective optical chopper 310 to generate a beam I3 traveling in a direction parallel to the optical axis of the beam I2 but opposite thereto, reflectors 322 and 323 for reflecting the beam I4 reflected by the reflective optical chopper 310 to generate a beam Is traveling in a direction parallel to the optical axis of the beam I4 but opposite thereto, a moving stage 330 on which the reflectors 320 and 321 are fixed and which can move in the directions along the optical axis of the beam I2, apertures 380 to 383 respectively provided for the incident beam I0 and output beams I1, I3, and a fixed base 360 for fixing the reflective optical chopper 310, reflectors 322, 323, and apertures 380 to 383 thereon, which permits the moving stage 330 to move thereon.

The reflective optical chopper 310 used in the present embodiment is constructed in the same structure as the reflective optical chopper 110 described in the first embodiment. However, the reflective optical chopper 310 of the present embodiment is positioned as inclined at a predetermined angle relative to the optical axis of the incident beam I0.

Further, the reflectors 320 and 321 used in the present embodiment are arranged in the same placement and operation as the reflectors 220 and 221 described in the second embodiment. In the present embodiment, however, the beam I3 generated at the reflector 321 is directed to the transmissive portion of the rotating plate 311, having generated the transmitted beam I2, to be transmitted by the transmissive portion thereof. The transmissive portion transmitting the beam I3 and the transmissive portion transmitting the beam I2 may be the same or may be different from each other.

When the beam I4 reflected by the reflective portion of the rotating plate 311 is incident to the reflector 322, the reflector 322 reflects the beam I4 toward the reflector 323. When the beam reflected by the reflector 322 is incident to the reflector 323, the reflector 323 reflects the beam to generate the beam I5. The optical axis of this beam I5 is parallel to the optical axis of the beam I4 and the beam I5 travels in the opposite direction to the beam I4.

Further, the reflectors 320 to 323 are arranged so that the optical axis of the beam I3 generated as reflected by the reflector 321 and the optical axis of the beam I1 generated as reflected by the rotating plate 311 with incidence of the beam I5 run on the same optical axis after the reflective optical chopper 310. Accordingly, when the incident beam I0 is incident to the transmissive portion of the rotating plate 311 to generate the transmitted beam I2, the beam I3 generated at the reflector 321 passes through the transmissive portion of the rotating plate 311; when the incident beam I0 is incident to the reflective portion of the rotating plate 311 to generate the reflected beam I4, the beam I5 generated at the reflector 323 is reflected by the reflective portion of the rotating plate 311 to become the beam I1.

The apertures 380 and 381 through which the incident beam I0 passes are for positioning the optical axis of the incident beam I0 with respect to the entrance optical axis of the optical delay apparatus, while the apertures 382 and 383 through which the outgoing beams I1 and I3 pass are for positioning the optical axis of the outgoing beams I1 and I3 with respect to the exit optical axis of the optical delay apparatus.

Figure 12:
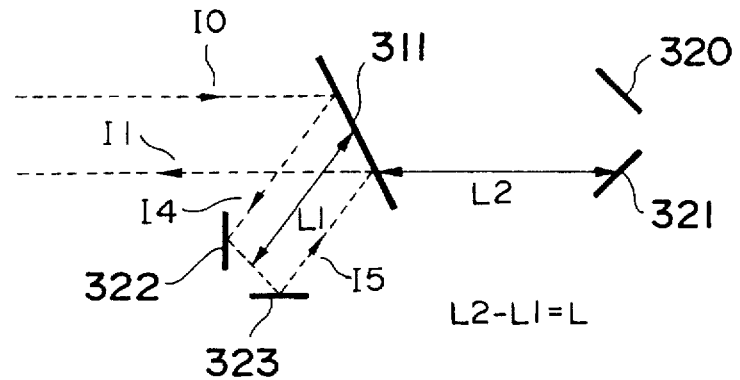
FIGS. 12 and 13 are explanatory drawings of the operation of the optical delay apparatus according to the third embodiment.
Figure 13:
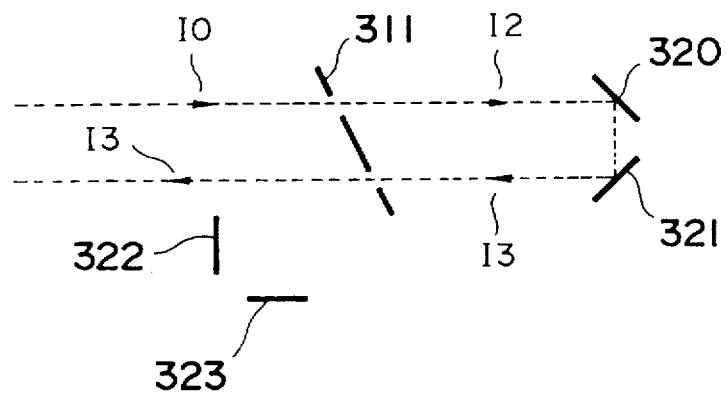

The optical delay apparatus according to the present embodiment acts as follows. FIGS. 12 and 13 are explanatory drawings of the operation of the optical delay apparatus according to the present embodiment.

When the incident beam I0 having passed the apertures 380 and 381 is incident to the reflective portion of the rotating plate 311 (FIG. 12), the incident beam I0 is reflected by the reflective portion of the rotating plate 311 to generate the reflected beam I4. The beam I4 is reflected by the reflectors 322 and 323 to generate the beam I5 traveling in the opposite direction to the beam I4 and on the optical axis parallel to that of the beam I4. Then the beam I5 is reflected by the reflective portion of the rotating plate 311 to generate the beam I1 traveling in the opposite direction to the incident beam I0 and on the optical axis parallel to that of the incident beam I0.

On the other hand, when the incident beam I0 is incident to the transmissive portion of the rotating plate 311 (FIG. 13) the incident beam I0 is transmitted by the transmissive portion of the rotating plate 311 to generate the beam I2. This beam I2 is reflected by the reflectors 320 and 321 to generate the beam I3. The beam I3 passes through the transmissive portion of the rotating plate 311 to travel on the same optical axis as the beam I1.

As the rotating plate 311 is rotated by the motor 312, the beam I1 having a fixed optical pathlength and the beam I3 having an optical pathlength different from that of the beam I1 are generated regularly alternately to be output on the same optical axis. By moving the reflectors 320 and 321 by the moving stage 330, the optical pathlength difference between the beam I1 and the beam I3 can be changed.

An operation timing of the optical delay apparatus according to the present embodiment is similar the operation timing in FIG. 7.

Figure 14:
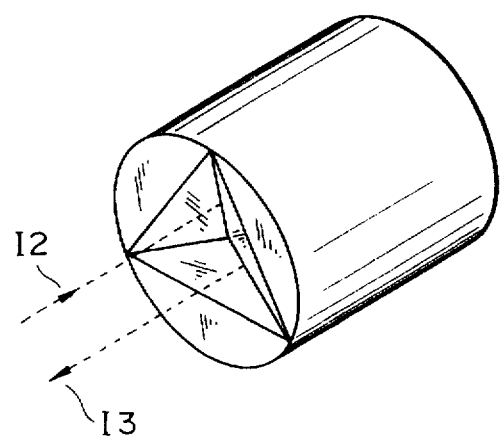
FIG. 14 is a perspective view of a retroreflector.

The reflectors 320 and 321 may be replaced by a retroreflector as shown in FIG. 14. The retroreflector is a cube corner reflector comprised of three reflective surfaces, and with incidence of the beam I2 it outputs the beam I3 traveling in the opposite direction to the beam I2 and in parallel with the optical axis thereof. Since use of this reflector can readily shorten the distance between the optical axis of the beam I2 incident and the optical axis of the beam I3 outgoing, the two beams can be arranged to pass through one transmissive portion of the reflective optical chopper 311. This is also the case when the reflectors 322 and 323 are replaced by a retroreflector.

The optical delay apparatus according to the second embodiment necessitates the two reflective optical choppers and necessitates rotating them in synchronization, whereas the optical delay apparatus according to the present embodiment needs to use only one reflective optical chopper, which makes the structure simple and facilitates the control.

(Fourth Embodiment)

Figure 15:
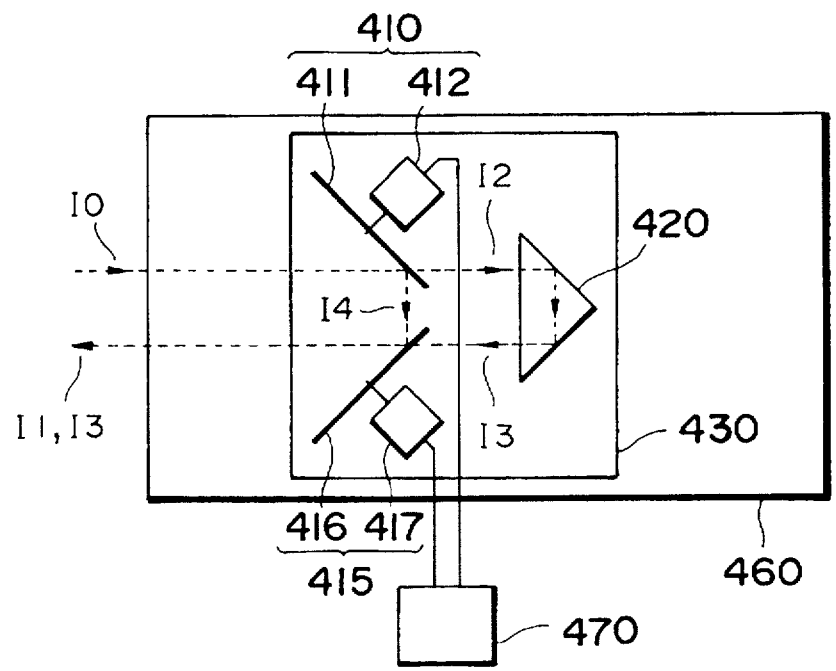
FIG. 15 is a plan view of an optical delay apparatus according to the fourth embodiment.

Next explained is the fourth embodiment. FIG. 15 is a plan view of the optical delay apparatus according to the present embodiment.

The optical delay apparatus according to the present embodiment comprises a reflective optical chopper 410 for subjecting the incident beam I0 to alternate reflection and transmission to alternately generate a reflected beam I4 and a transmitted beam I2, a rectangular prism 420 for reflecting the beam I2 transmitted by the reflective optical chopper 410 and generating a beam I3 traveling in the opposite direction to the beam I2 and in parallel with the optical axis of the beam I2, a reflective optical chopper 415 for, with incidence of the beam I4 reflected by the reflective optical chopper 410, reflecting the beam I4 and for, with incidence of the beam I3 reflected by the rectangular prism 420, transmitting the beam I3, a moving stage 430 on which the reflective optical choppers 410, 415 and rectangular prism 420 are fixed and which can move in the directions along the optical axis of the incident beam I0, a fixed base 460 which permits the moving stage 430 to move thereon, and a chopper controller 470 for controlling rotation synchronized with reflection/transmission of beam at the two reflective optical choppers 410 and 415.

The reflective optical choppers 410, 415 and chopper controller 470 used in the present embodiment are arranged in the same structure and in the same operation as the reflective optical choppers 210, 215 and chopper controller 270 in the second embodiment.

The rectangular prism 420 used in the present embodiment is a substitute for the two reflectors 210 and 211 in the second embodiment and has the same action. Namely, when the beam I2 is incident to the prism, it reflects the beam by the two mutually orthogonal surfaces to generate the beam I3 traveling in the opposite direction to the beam I2 and in parallel with the optical axis of the beam I2.

Figure 16:
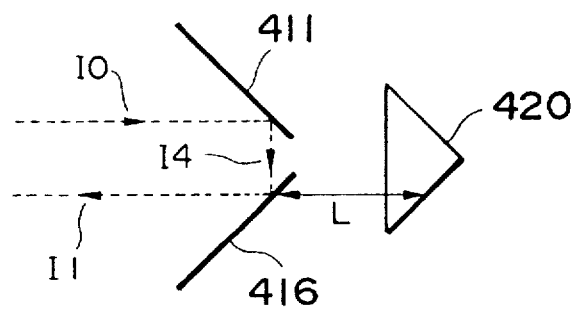
FIGS. 16 and 17 are explanatory drawings of the operation of the optical delay apparatus according to the fourth embodiment.
Figure 17:
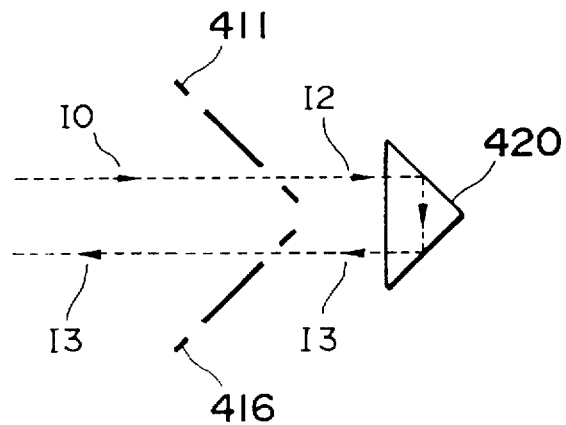

The most significant difference of the present embodiment from the second embodiment is that the two reflective optical choppers 410, 415 and rectangular prism 420 are fixed on the moving stage 430 and they move together in the directions along the optical axis of the incident beam I0 on the fixed base 460. Accordingly, as the moving stage 430 moves on the fixed base 460, change occurs in the optical pathlengths of the beam I1 (FIG. 16), obtained after the incident beam I0 is reflected by the reflective portion of the rotating plate 411 and then is reflected by the reflective portion of the rotating plate 416, and of the beam I3 (FIG. 17), obtained after the incident beam I0 is transmitted by the transmissive portion of the rotating plate 411, is reflected by the rectangular prism 420, and then is transmitted by the transmissive portion of the rotating plate 416, but the optical pathlength difference between them is constant.

In summary, the optical delay apparatus according to the first to third embodiments are arranged to output the beam I1 and beam I3 having mutually different delays regularly alternately on one optical axis, which can change the delay of the beam I3 with respect to the reference beam I1 having the reference delay, whereas the optical delay apparatus according to the present embodiment is arranged in the same manner in that the beam I1 and beam I3 having mutually different delays are output regularly alternately on one optical axis, but it can change the delays of the two beams as maintaining constant the delay difference between the beam I1 and the beam I3.

An operation timing of the optical delay apparatus according to the present embodiment is similar the operation timing in FIG. 7.

(Fifth Embodiment)

Figure 18:
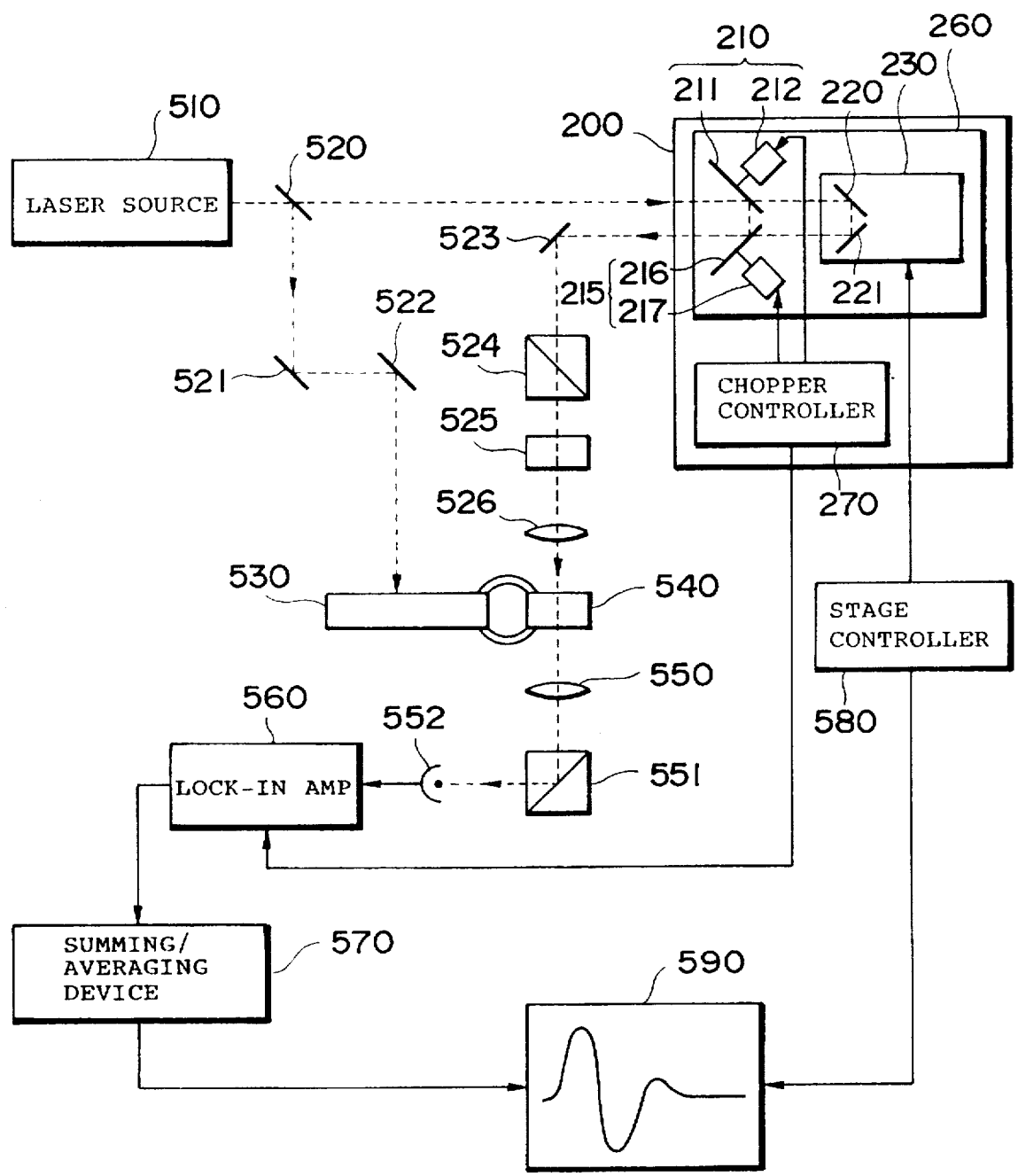
FIG. 18 is a structural drawing of an electric-field measuring apparatus using the optical delay apparatus according to the second embodiment.

Next explained is the fifth embodiment. The present embodiment is an example in which the optical delay apparatus according to the second embodiment is used in an electric-field measuring apparatus. FIG. 18 is a structural drawing of the electric-field measuring apparatus using the optical delay apparatus according to the second embodiment.

The electric-field measuring apparatus according to the present embodiment comprises a laser source 510 for outputting picosecond pulsed laser light of which the repeating frequency is, for example 80 MHz, very high, a half mirror 520 for transmitting part of the laser light but reflecting the rest, reflectors 521 and 522 for guiding the laser light (trigger light) reflected by the half mirror 520 to the measured object 530, the optical delay apparatus 200 to which the laser light transmitted by the half mirror 520 is incident and which outputs the two beams having different optical pathlengths regularly alternately, a polarizer 524 for transmitting only a linearly polarized light component polarized in one direction out of the beam (sampling light) output from the optical delay apparatus 200, a phase compensation plate 525 for converting the sampling light, having become the linearly polarized light, into circularly polarized light, a lens 526 for condensing the sampling light having become the circularly polarized light to make it incident to an electro-optic material 540, the electro-optic material 540 which changes its refractive index according to a voltage or electric-field of the measured object 530, to which the sampling light is incident, and which outputs the beam with polarization states changing according to the change of the index, a lens 550 for converting the beam output from the electro-optic material 540 into parallel light, an analyzer 551 for outputting only a linearly polarized light component polarized in one direction out of the beam having passed through the lens 550, a photodetector 552 for measuring the intensity of the beam output from the analyzer 551 and outputting a voltage signal according to the intensity, a lock-in amplifier 560 for detecting the voltage signal output from the photodetector 552 in synchronization with a two-beam switch timing in the optical delay apparatus 200, a summing/averaging device 570 for summing the predetermined number of output values from the lock-in amplifier 560, obtaining an average value thereof, and outputting it, a stage controller 580 for changing the optical pathlength difference between the two beams generated in the optical delay apparatus 200, and a waveform display 590 for receiving the voltage signal according to the optical pathlength difference and the voltage signal output from the summing/averaging device 570 and for displaying a waveform of intensity of the electric-field applied to the electro-optic material 540.

The trigger light incident to the measured object 530 is the one which was output from the laser source 510, was partly reflected by the half mirror 520, was reflected by the reflectors 521 and 522, and then was incident to the measured object 530. The measured object 530 is, for example, a picosecond circuit such as a photoconductive optical switch, which generates an electric pulse by photoelectric conversion with incidence of the trigger light. This electric pulse is applied to the electro-optic material 540. This electro-optic material 540 has a property to change its refractive index depending upon the voltage applied thereto. This trigger light is not subject to any modification, the trigger light is steadily incident to the measured object 530 to generate the electric pulse, and the voltage according to the electric pulse is also steadily applied to the electro-optic material 540.

The voltage may be applied directly to the material 540 by coupling the measured object 530 with the electro-optic material 540 by a signal line, or the measured object 530 and electro-optic material 540 may be placed in proximity with each other so as to permit a leaking electric-field of the object to be applied to the electro-optic material 540.

After output from the laser source 510 and transmitted by the half mirror 520, the laser beam is first incident to the optical delay apparatus 200. The optical delay apparatus 200 used herein is the one according to the second embodiment. Namely, as the laser beam, after output from the laser source 510 and partly transmitted by the half mirror 520, is incident to the delay apparatus 200 and as the rotating plates 211 and 216 are rotated by the motors 212 and 217 controlled to rotate synchronously by the chopper controller 270, the delay apparatus regularly alternately outputs the laser beam generated as transmitted by the transmissive portion of the rotating plate 211, reflected by the reflectors 220 and 221, and further transmitted by the transmissive portion of the rotating plate 216, and the laser beam generated as reflected by the reflective portion of the rotating plate 211 and then reflected by the reflective portion of the rotating plate 216, which become the sampling light. The repeating frequency of alternate output of the laser beams ranges normally from several hundred Hz to several kHz, and this repeating frequency is dependent on the performance of the lock-in amplifier, which can realize several Hz to several hundred kHz. Then this sampling light is output in the opposite direction to the incident beam and in parallel with the optical axis of the laser beam incident to the optical delay apparatus 200. Also, the moving stage 230 for fixing the two reflectors 220 and 221 thereon can move in the directions along the optical axis of the incident laser beam by the stage controller 580, and this movement can change the delay of one beam out of the two beams forming the sampling light.

The sampling light output from the optical delay apparatus 200 is guided into the polarizer 524 to be output as linearly polarized light. Then the sampling light, having become the linearly polarized light, is guided into the phase compensation plate 525 having the optic axis inclined 45° relative to the optic axis of the polarizer 524 and causing a phase difference of quarter wave between components in the directions of the respective optic axes, to be changed into circularly polarized light and-then to be output therefrom.

While the sampling light having become the circularly polarized light is condensed by the lens 526, is incident to the electro-optic material 540, and then is transmitted thereby, the polarization states thereof change according to the index change of the electro-optic material 540 to normally become elliptically polarized light. The sampling light of elliptically polarized light is converted into parallel light by the lens 550 to be guided into the analyzer 551, from which only the linearly polarized light component polarized in one direction is output. Then the intensity of the component is measured by the photodetector 552.

Accordingly, the voltage signal output from the photodetector 552 becomes a signal according to the voltage intensity of the electric pulse generated in the measured object 530 with incidence of the trigger light. The lock-in amplifier 560 synchronously detects the voltage signal output from this photodetector 552 with the timing signal output from the chopper controller 270 as to generation of the two beams forming the sampling light, thereby detecting a difference of output value of the photodetector 552 between the two beams of the sampling light.

The summing/averaging device 570 sums up the predetermined number of outputs from the lock-in amplifier 560 and averages them to reduce noise, and thereafter the resultant is supplied to the waveform display 590. On the other hand, a signal according to the position of the moving stage 230 of the optical delay apparatus 200, that is, according to the delay time difference between the two beams forming the sampling light, is output from the stage controller 580 to be supplied as a sweep signal to the waveform display 590. Therefore, the waveform display 590 indicates the waveform of the electric pulse generated in the measured object 530 with incidence of the trigger light.

Figure 19:
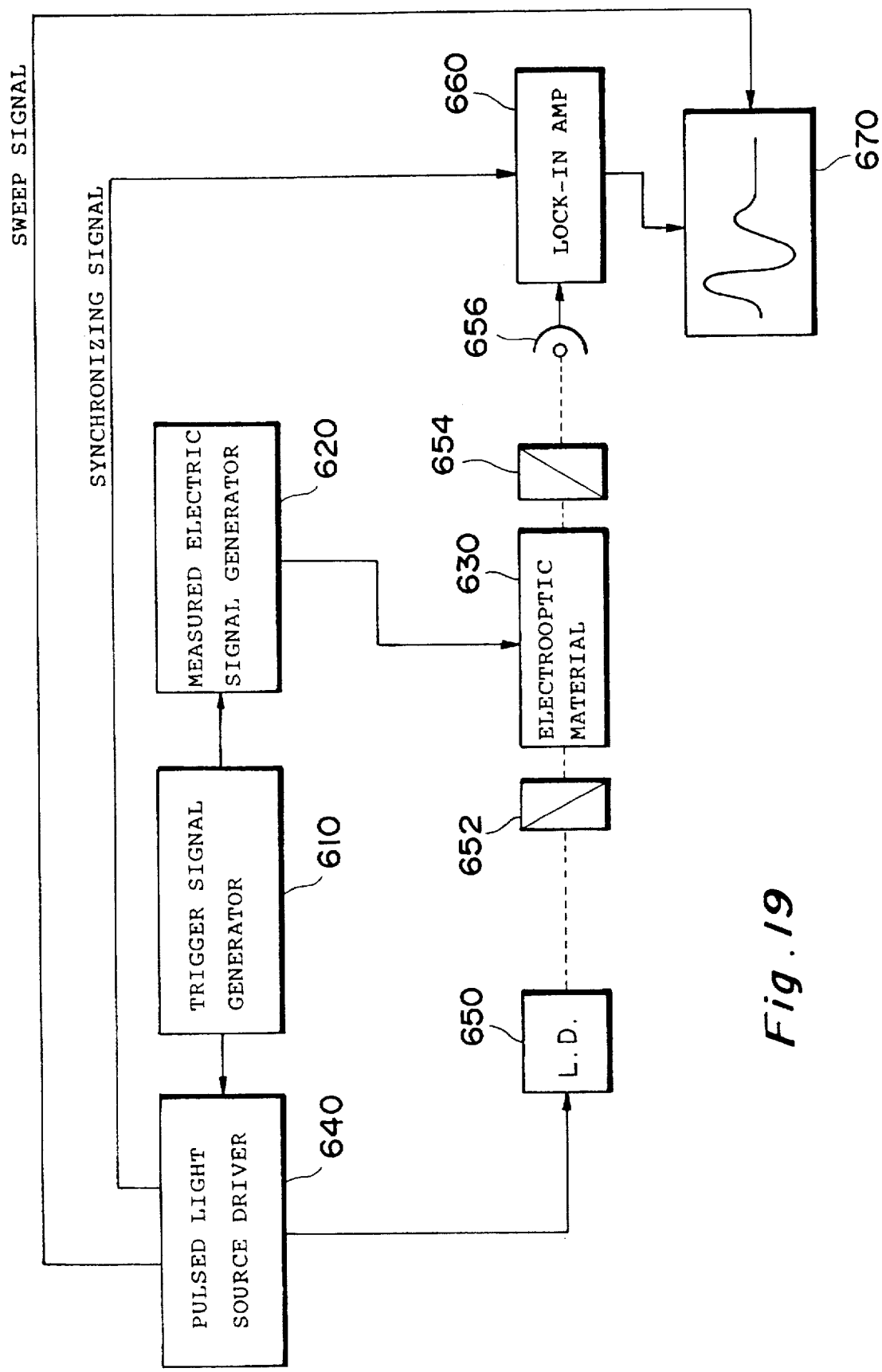
FIG. 19 is an explanatory drawing of a lighting timing method in the electric-field measuring apparatus.

The method for obtaining the difference between the voltage signals at respective timings of the two beams forming the sampling light in this manner is equivalent to the lighting timing control method in the electric-field measuring apparatus with a semiconductor laser as a light source (for example, as described in Japanese Laid-open Patent Application No. 3-131772 or 1994 Asia Pacific Microwave Conference Proceedings, pp. 1167–1170). FIG. 19 is an explanatory drawing of the lighting timing method in the electric-field measuring apparatus.

In this method, a measured electric signal generator 620, receiving a trigger signal output from a trigger signal generator 610, generates a measured electric signal according to the input of trigger signal, and the measured electric signal is applied to the electro-optic material 630. On the other hand, a pulsed light source driver 640, similarly receiving a trigger signal output from the trigger signal generator 610, lights a laser light source 650 alternately at two lighting timings of a certain reference timing and a measurement timing being subject to gradual delay, from the timing of the input of trigger signal. The sampling light output from the laser light source 650 passes through a polarizer 652, the electro-optic material 630, and an analyzer 654 in this order, and thereafter the intensity thereof is measured by a photodetector 656. A voltage signal according to the light intensity, output from the photodetector 656, is detected by the lock-in amplifier 660 in synchronization with the lighting timing signal of the laser light source 650 output from the pulsed light source driver 640. Then the voltage signal output from the lock-in amplifier 660 is supplied to a waveform display 670, and the voltage signal according to the lighting timing of the laser light source 650 generated by the pulsed light source driver 640 is also supplied as a sweep signal to the waveform display 670. With sequentially changing the timings of lighting of the laser light source 650 by the pulsed light source driver 640, the waveform display 670 indicates the waveform of the measured electric signal generated in the measured electric signal generator 620.

In such a lighting timing control method, the laser light source 650 needs to permit electric control of the output timing of the sampling light, and thus the light source is limited to semiconductor lasers permitting it. For example, laser light sources of large output, such as a titanium sapphire laser, do not permit accurate electric control of lighting timing, and thus this method cannot be used.

In contrast with it, use of the optical delay apparatus according to the present invention permits easy control of generation timing of laser light in the laser light source as described above, and thus it enables use of the laser light sources of large output such as the titanium sapphire laser.

Since the trigger light is continuously incident to the measured object so that the measured object operates steadily, it can prevent a malfunction from occurring and in turn causing distortion of electric pulse waveform. Therefore, the apparatus can be suitably used for evaluation of precision devices such as digital ICs for microwaves in the several ten GHz band, for example.

The same action can be achieved where the sampling light is formed using the optical delay apparatus according to the first and third embodiments. Also, the sampling light may be formed using the optical delay apparatus according to the fourth embodiment. In this case, since the two beams forming the sampling light are those the delay times of which are changed while the delay difference between them is maintained constant. the waveform indicated on the waveform display 590 is a time-differential waveform of the electric pulse waveform generated in the measured object 530. Accordingly, the electric pulse waveform generated in the measured object 530 can be attained by integrating the waveform indicated on the waveform display 590.

The present invention may involves a variety of modifications without having to be limited to the above embodiments. For example, the above embodiments used the one or two reflectors, retroreflector, or rectangular prism for generating the beam traveling in the opposite direction to the incident beam and in parallel with the optical axis of the incident beam, but, without having to be limited to them, three or more reflectors may be used, or a corner-cube prism may be used.

Also, the second embodiment was arranged to connect the two rotating plates directly with the respective motors and to rotation-drive them as achieving synchronization by the chopper controller, but the two rotating plates may be rotation-driven through gears and belts by one motor. In this case, the chopper controller is not necessary, because the two rotating plates always rotate in synchronization.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 869/1996 filed on Jan. 8, 1996 is hereby incorporated by reference.

What is claimed is:

1. An optical delay apparatus comprising:

beam splitting/coupling means for, with incidence of an incident beam, generating a first beam traveling in an opposite direction to said incident beam and a second beam traveling in a same direction as said incident beam and for, with incidence of a third beam traveling in the opposite direction to said second beam, outputting said first beam when said first beam is generated and the third beam when said first beam is not generated, alternately in a same direction and on a same optical axis;

reflecting means for outputting said third beam, based on said second beam; and moving means for moving at least said reflecting means in a direction along an optical axis of said second beam.

2. An optical delay apparatus according to claim 1, wherein said beam splitting/coupling means comprises:

a rotating plate in which reflective portions and transmissive portions are formed regularly alternately on a circumference about a center point on a plane normal to an optical axis of said incident beam, which, when said incident beam is incident to said reflective portion, reflects said incident beam to generate said first beam, and which, when said incident beam is incident to said transmissive portion, transmits said incident beam to generate said second beam and transmits said third beam, and a rotation drive section for rotating said rotating plate at constant speed about said center point on said plane, and wherein said reflecting means is a reflector having a reflective surface normal to the optical axis of said second beam.

3. An optical delay apparatus according to claim 2, said apparatus further comprising a semi-transparent mirror for reflecting a part of each of said first and said third beams output from said beam splitting/coupling means, in a direction different from a direction of incidence thereof.

4. An optical delay apparatus according to claim 1, wherein said reflecting means comprises a plurality of reflective surfaces, which, with incidence of said second beam, generates said third beam with an optical axis different from the optical axis of said second beam.

5. An optical delay apparatus according to claim 4, wherein said beam splitting/coupling means comprises:

a first rotating plate in which first reflective portions and first transmissive portions are formed regularly alternately on a circumference about a first center point on a first plane not normal to the optical axis of said incident beam, which, when said incident beam is incident to said first reflective portion, reflects said incident beam to generate a fourth beam, and which, when said incident beam is incident to said first transmissive portion, transmits said incident beam to generate said second beam;

a second rotating plate in which second reflective portions and second transmissive portions are formed regularly alternately on a circumference about a second center point on a second plane perpendicular to said first plane, which, when said fourth beam is incident to said second reflective portion, reflects said fourth beam to generate said first beam, and which, when said third beam is incident to said second transmissive portion, transmits said third beam;

a first rotation drive section for rotating said first rotating plate at constant speed about said first center point on said first plane;

a second rotation drive section for rotating said second rotating plate at constant speed about said second center point on said second plane; and a rotation control section for controlling said first and said second rotation drive sections so that when said first rotating plate generates said fourth beam, said second rotating plate reflects said fourth beam to generate said first beam and so that when said first rotating plate does not generate said fourth beam, said second rotating plate transmits said third beam.

6. An optical delay apparatus according to claim 4, wherein said beam splitting/coupling means comprises:

a rotating plate in which reflective portions and transmissive portions are formed regularly alternately on a circumference about a center point on a plane not normal to the optical axis of said incident beam, which, when said incident beam is incident to said reflective portion, reflects said incident beam to generate a fourth beam and reflects a fifth beam incident as traveling in an opposite direction to said fourth beam, so as to generate said first beam, and which, when said incident beam is incident to said transmissive portion, transmits said incident beam to generate said second beam;

a rotation drive section for rotating said rotating plate at constant speed about said center point on said plane; and a reflective section comprising a plurality of reflective surfaces to generate said fifth beam, based on said fourth beam.

7. An optical delay apparatus according to claim 1, wherein said moving means moves said beam splitting/coupling means in an integral manner with said reflecting means.

* * * * *